UNITED STATES PATENT OFFICE.

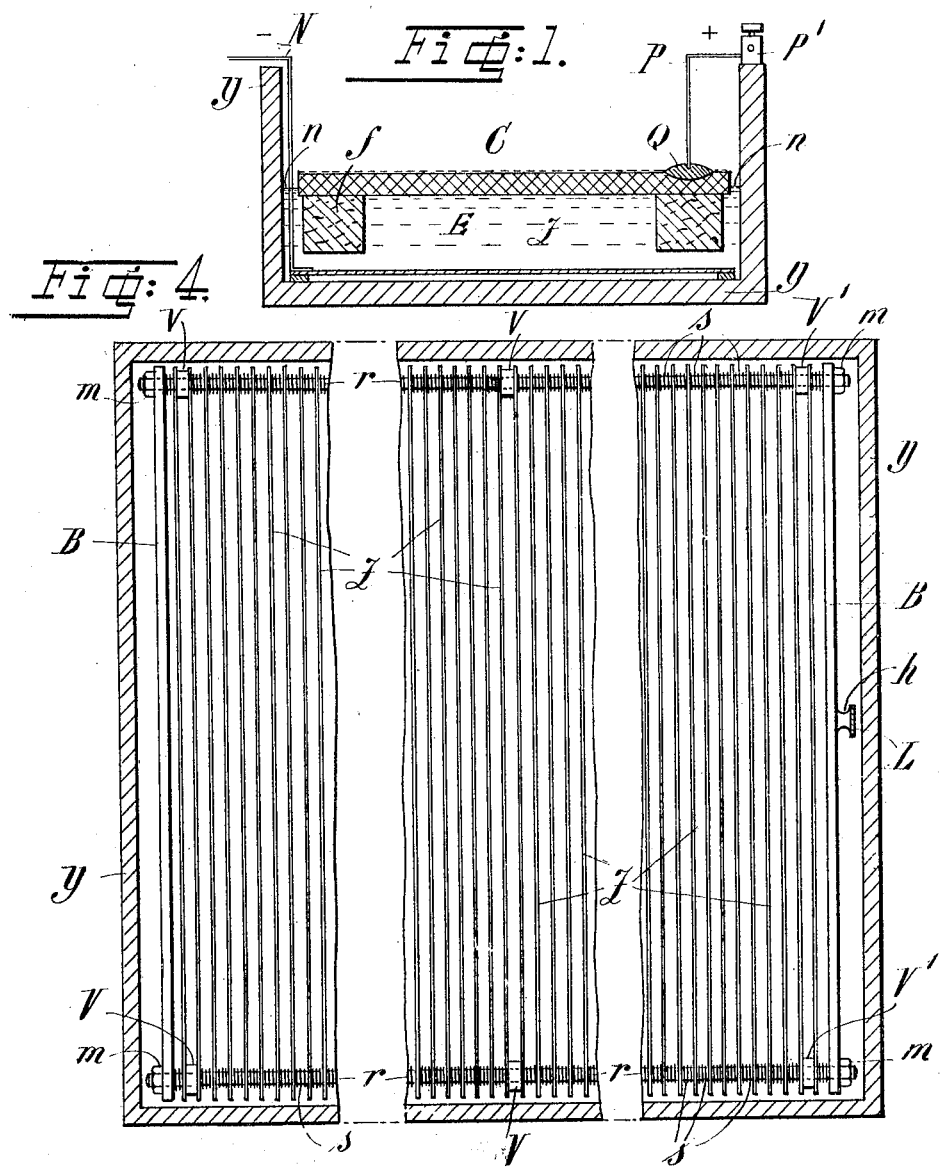

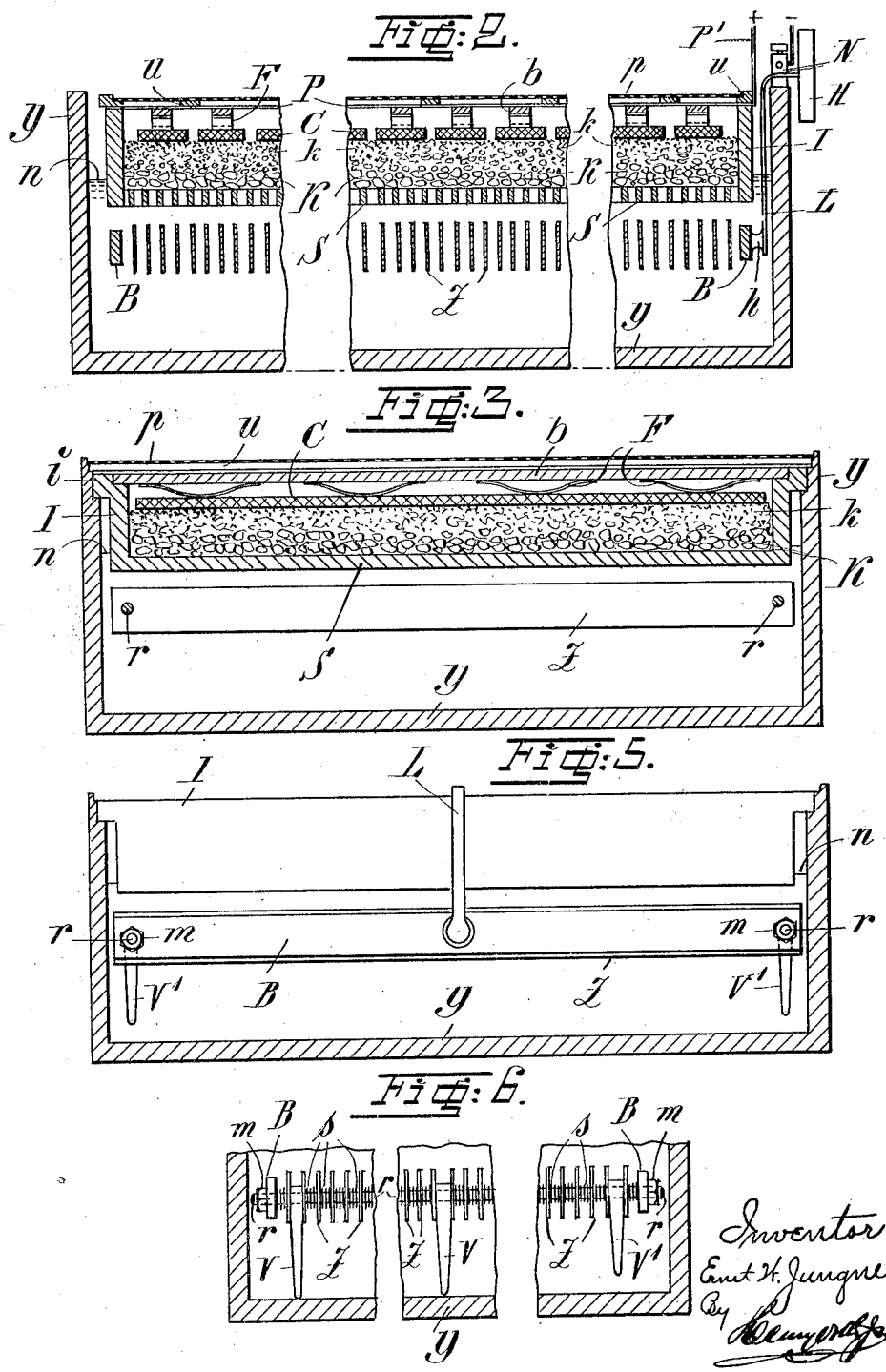

ERNST WALDEMAR JUNGNER, OF KNEIPPBADEN, SWEDEN.

PRIMARY GALVANIC BATTERY WITH UNALTERABLE ELECTROLYTE.

1,370,119.  Specification of Letters Patent.  Patented Mar. 1, 1921.

Application filed August 16, 1918. Serial No. 250,196.

*To all whom it may concern:*

Be it known that I, ERNST WALDEMAR JUNGNER, a citizen of the Kingdom of Sweden, residing at Kneippbaden, Sweden, have invented new and useful Improvements in Primary Galvanic Batteries with Unalterable Electrolyte, of which the following is a specification.

This invention relates to primary galvanic batteries for generating electric energy for domestic illuminations, for driving small motors, etc.

The object of the invention is to so construct a primary galvanic battery that it will generate electric currents of great intensity and practically constant voltage for long periods at such a low cost that the battery can compete with other sources of electric current for illumination and similar purposes.

In order that primary galvanic batteries shall be serviceable for the production of current to any greater extent, it is necessary that the costs of all the active substances of the battery as well as the costs of its management and maintenance be reduced to a minimum.

I have attained such a considerable reduction of costs by providing a primary galvanic battery or cell having unalterable electrolyte and depolarized by means of the oxygen of the air. The metal consumed for the generation of current is transformed into an insoluble hydrate, a valuable by-product.

The invention comprises a primary galvanic cell or battery having an electro-positive porous electrode exposed to the air, a substance disposed on the air surface of said electrode to facilitate the depolarizing action by the oxygen of the air, an unalterable electrolyte, and an electronegative electrode of a metal the hydroxid of which is insoluble in said electrolyte.

In the accompanying drawings I have shown some embodiments of my invention.

Figure 1 is a vertical section of a battery according to this invention adapted to illustrate the principles of my invention.

Fig. 2 is a longitudinal vertical section of a practical embodiment of my invention.

Fig. 3 is a vertical section thereof, taken at right angles to Fig. 2.

Fig. 4 is a horizontal sectional view of another battery according to this invention.

Fig. 5 is a cross sectional view, and Fig. 6 a partly broken vertical section thereof.

In describing my invention I will first set forth the principles of the invention, reference being had to Fig. 1 of the accompanying drawings.

Placed on the bottom of a receptacle of wood, glass, pottery or other suitable material is a plate Z of zinc provided with a conducting wire N. Into the receptacle Y an electrolyte E is introduced consisting of a solution of a salt of an alkali metal, for instance common salt (chlorid of sodium). Placed above the electrolyte E is a plate C of porous, electrically conducting carbon (for instance porous graphite) supported by floats made of a substance of less specific gravity than the solution, as cork or any other suitable material having small specific gravity. The volume of said floats is so adjusted that the carbon plate only for a small part of its height is submerged in the electrolyte (for instance about 2 or 3 millimeters). In the upper surfaces of the carbon plate there is a recess filled with mercury Q, into which a conducting wire P is introduced and connected with a terminal screw $P^1$ attached to the receptacle. On the upper surface of the carbon plate a thin layer of copper oxid (CuO) is strewn.

If in this battery the two poles are connected by a suitable resistance, the following summary reaction takes place while current is generated:

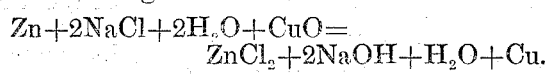

Consequently, at the negative pole-electrode (the zinc) a layer of zinc chlorid ($ZnCl_2$) is deposited and at the positive pole-electrode a layer of sodium hydrate (NaOH) is generated which gradually fills the pores of the carbon plate. Owing to the diffusion, however, the two substances $ZnCl_2$ and $NaOH$ are successively spread through the whole volume of the electrolyte and, when meeting one another, the following reaction takes place:

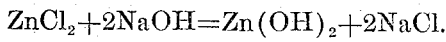
$$ZnCl_2 + 2NaOH = Zn(OH)_2 + 2NaCl.$$

The finely divided copper reduced upon the generation of current and being in permanent contact, on the one hand, with the porous carbon plate—and, owing thereto, also with the electrolyte—and, on the other hand, with the air, combines very easily with the oxygen of the latter, and then the same reaction and generation of current takes place anew.

As will appear from the reactions stated above, the electrolyte remains unaltered, and need not be renewed and consequently the costs of the renewal are eliminated. The quantity of the electrolyte is also under such circumstances immaterial.

Further it will appear from said reactions, that the metallic zinc is transformed into insoluble zinc hydrate. This is deposited in the form of a thin layer on the zinc plate. Consequently, the final result will be that the zinc plate during the generation of current is gradually oxidized and replaced by a layer of zinc hydrate. The latter may, after the liquid is drawn off, be easily collected, and fresh zinc supplied for continued generation of current.

The collected zinc hydrate may either as such be used for other purposes or be utilized for the production of zinc compounds having a great commercial value, as for instance the oxid (the paint zinc-white) or the sulfate or the chlorid, etc., in which compounds the zinc has a much greater commercial value than in its metallic state. Thus the costs of this material are eliminated.

Of course, the zinc may be reduced from the hydrate by means of carbon in electric furnaces or in common fuel furnaces, and used again for generation of current in the battery.

The reduction of the zinc from the hydrate may be effected in an electric way presupposing that sufficiently cheap electric current is accessible. Since, finally, the depolarization is effected continuously by the oxygen of the air, also the costs thereof are eliminated. The alternate de-oxidation and the renewed re-oxidation of the copper of the oxid by means of the oxygen of the air are continuous.

Thus the costs of all consumable materials are entirely eliminated or at least reduced to a minimum by the aid of the present invention.

Further, the costs of the attendance and maintenance of the battery are also reduced to a minimum by the use of the unalterable electrolyte in combination with the use of the oxygen of the air as a depolarizing means and are substantially limited to the renewal of the zinc electrode and the removal of the zinc hydrate.

To produce an unalterable electrolyte also other metals than zinc and other electrolytes than common salt may be used.

It will appear from the reaction formulas stated above, that the following conditions are necessary for this purpose, viz:

1. The acid radical of the electrolyte shall form a soluble salt with the metal of the battery.

2. The hydroxid of the positive radical of the electrolyte shall be soluble in water, and 3. From the metal salt according to item 1, shall be precipitated an insoluble metal hydroxid by the hydroxid according to item 2.

Consequently, it is evident that, if the metal of the battery consists of zinc, the electrolyte may consist of any soluble salt of the metals potassium and sodium the acid radicals of which form with zinc a salt soluble in water (for instance the sulfates, the chlorids, the nitrates etc.), since the hydroxids of said metals are soluble in water and precipitate from the zinc salts zinc hydrates $Zn(OH_2)$ insoluble in the electrolyte. On the contrary, zinc cannot be combined with an ammonium salt as electrolyte, since, though the hydrate of the radical $NH_4$ is soluble in water, the zinc salts are not precipitated by the same; instead thereof basic zinc-ammonium-salts soluble in water are formed, and therefore the electrolyte does not remain unalterable. On the passage of the current the zinc is gradually precipitated from said basic salts in the pores of the positive pole electrode in the form of insoluble zinc oxid (hydrate) stopping up said pores, and owing thereto the battery will soon become inactive. In combination with metal electrodes of tin, lead, aluminium, etc., may be used salts of potassium and sodium as well as of ammonium, since the soluble salts of said metals are precipitated by alkali hydrates as well as by ammonia. The question whether the hydrate of the metal is soluble in an excess of the precipitating means or not is of no or very little significance for the present system.

The salts of potassium, sodium and ammonium are in the following included in the denomination alkali salts and their hydrates and carbonates in the denomination alkalis.

In combination with a metal electrode of iron, salts of potassium, sodium and ammonium may be used. In the combination iron-ammonium-salt it is, however, to be noted that, at the generation of current, ferrous oxid salts are first formed, which salts, as is well-known, are not precipitated by ammonia in the presence of ammonium-salts but form soluble basic salts of various composition. With said combination, however, an unalterable electrolyte may be obtained, if the air has free access to the electrolyte, the ferrous ammonium-salt being oxidized to ferri-hydrate with regeneration of the original ammonium-salt, for instance according to the reaction:

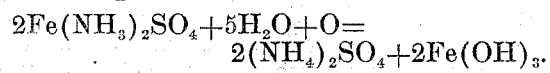
$$2Fe(NH_3)_2SO_4 + 5H_2O + O = \\ 2(NH_4)_2SO_4 + 2Fe(OH)_3.$$

With the combination iron-ammonium-salt in connection with a suitable air-depolarizing electrode securing an unalterable electrolyte, a comparatively powerful and durable battery may be obtained. This is also the case with tin in combination with an ammonium-salt, said metal it is true, being comparatively expensive; on the other hand, however, the metal may be very easily recovered from the hydrate. On the whole, however, zinc in combination with a salt of potassium or sodium is to be preferred to other combinations.

Finally, it will appear from the above that in order to obtain an unalterable electrolyte adapted for primary galvanic batteries no electrolytes whatever consisting of acids or bases can be used.

As an air-depolarizing electrode any hitherto known construction may be used but not so advantageously as those described below.

For obtaining an effective air-depolarization any well-known air-depolarizing substance promoting the depolarization may be used, as for instance the metals copper, silver and mercury, preferably in a finely divided state, or suitable compounds of said metals or other metal compounds (for instance oxygen compounds of manganese) or, on the whole, such primary substances and chemical compounds which absorb the oxygen of the air while forming oxidizing (depolarizing) substances, or, being oxidized from the beginning, obtain anew depolarizing properties after deoxidation during generation of current by being combined with the oxygen of the air. By the use of such promoting substances practically constant currents are obtained during the life of the battery. It is evident, that substances promoting the air-depolarization are to be chosen with reference to the electrolyte or metal used. Thus they are to be chosen so as not to be soluble in the electrolyte, practically taken, since otherwise they diffuse to the negative pole-electrode (the soluble metal) and may there cause noxious local reactions. When using ammonium salts a manganese oxygen compound is to be preferred to compounds of copper, silver etc. as these latter are soluble in the electrolyte.

An essential point for obtaining an effective and quite durable air-depolarization in the present battery is—as has been found by the inventor—that the substance promoting the air-depolarization shall continuously be in intimate contact, on the one hand, with the porous positive carbon-electrode and the electrolyte therein and, on the other hand, with the atmospheric air. To obtain the best conditions in this respect the distance between the upper carbon surface or the substance promoting the depolarization placed thereon and the level of the electrolyte on the one hand and on the other hand the degree of porosity of the carbon are to be chosen suitably. If said distance be too small and the porosity of the carbon be too great, the upper surface of the carbon will be too wet, and owing thereto the particles of the substances promoting the depolarization will be completely soaked in the electrolyte, and the free access of the air to said particles will be substantially prevented. If on the other hand said distance be too great and the porosity of the carbon be too low, the surface of the carbon will be too dry and the contact with the electrolyte located in the pores will be incomplete, and, besides, the conductivity of the electrode will be greatly reduced. It is, however, not possible to give exact numbers or directions by the aid of which to obtain the best results; an optimum is, therefore, to be experienced in each separate case.

The pores of the porous carbon plate shown in Fig. 1 will during the operation of the battery be gradually filled with an electrolyte consisting for the greater part of alkali. On account thereof the electrolyte in the vessel of the battery will contain a corresponding excess of the salt of the active metal. At the generation of current the metal of said salt is gradually precipitated in an oxidized and insoluble state in the pores of the electrode carbon thus stopping up said pores.

Said formation of oxid in the pores of the carbon may, however, be easily prevented by adding to the electrolyte from the beginning a small quantity of alkali in the form of hydrate (or rather in the form of carbonate). Thus it has been experienced practically that, on using a quite neutral electrolyte, the carbon plate in a battery according to Fig. 1 had after half a year commenced to lose part of its activity, whereas, if a small quantity of alkali be added to the electrolyte, no precipitation of metal oxid takes place, and the battery is enabled to operate more than three years without the least precipitation of metal oxid and without any perceptible decrease of the strength of current.

The quantity of alkali to be added depends to a great extent according to circumstances. As an example of a suitable composition of the electrolyte the following may be stated:

| | | |
|---|---|---|
| Common salt | 150 | gr. |
| Sodium hydrate | 2.2 | " |
| Water | 850 | " |

The necessity of adding a small quantity of alkali to the electrolye does not, however, depend solely on the circumstance stated above; other conditions are of great importance in this case. The addition of alkali is to be confined rather carefully within certain limits, since, in case of too high a percentage of alkali, the battery loses its activity in part or completely and, in case of too low a percentage, the precipitation of oxid is not fully prevented.

An addition of alkali-metal carbonate is more suitable than an addition of hydrate, because the salts of calcium, magnesium etc. occurring in the common salt and causing precipitations of oxids or carbonates of said metals in the pores of the carbon-electrode are thereby completely precipitated. Thus it will be possible to use raw or impure common salt. In this case a suitable composition is as follows:

| | | |
|---|---|---|
| Raw common salt | 150 | gr. |
| Crystallized raw soda | 11 | " |
| Water | 850 | " |

It will appear from the above that the practical use and the economical realization of the battery described above presuppose that the metal-hydrate formed be collected or utilized anew in economical manner.

Further it is to be noted that in order to obtain a practically and economically serviceable primary galvanic battery of this kind the battery has to work quite automatically and permanently, for instance without extra devices for moving the electrodes, without effecting movements of the electrolyte, without supply of the oxygen of the air by mechanical means, etc., since each device of this kind as well as its management and maintenance would be too expensive in relation to the relatively feeble currents delivered by each separate battery or cell.

In order that the collection or renewed utilization of the metal hydrate formed may be of the importance intended by the present invention, the battery has to be constructed so as to generate comparatively large quantities of current.

Figs. 2 and 3 of the drawing illustrate a battery constructed according to the aforesaid and other conditions. Y is the vessel of the battery, preferably, of rectangular form and having a large horizontal surface in relation to its height. The vessel Y may be made of wood, pottery, impregnated (waterproofed) cement or sheets of a suitable metal, for instance iron, or other substances or of suitable constructive combinations of such material. In the form shown in the drawing it is supposed that the vessel consists of wood, which, to prevent the absorption of the electrolyte in the pores and the formation of creeping salts, is impregnated internally and, if desired, externally with a suitable substance, as paraffin, or coated with a suitable protecting substance (any suitable paint) or, to the necessary extent covered with sheet metal or foil, as iron foil.

On the inner long sides the vessel, Fig. 3, is provided at the top, with recesses, a rectangular frame I being, by means of lateral projections $i$, placed on the bottoms of said recesses. Said frame may consist of the same material as the outer vessel (the cell vessel) Y, but is, preferably, made of wood (which in this case need not be treated in any special manner.)

At the bottom of the frame I thin strips of wood S are inserted, preferably, parallel to the short side of the outer vessel and placed close to each other so as to form a grid. For this grid may—though less advantageously—be substituted perforated or porous plates of other suitable substances, as grids of copper or other suitable metals, perforated plates of ebonite, mica, wood or any suitable, indifferent metal or of asbestos or plates of cellulose or, finally, nets of bast or other fibers of cellulose.

Placed above said grid is a layer of pieces K of electrically conducting carbon the size of said pieces being so chosen that they cannot fall down between the strips forming the grid. Above this layer of large pieces of carbon another layer of smaller carbon pieces K (for instance of the size of small shot), are, preferably, placed. The carbon pieces may consist of any sort of electrically conducting carbon, as electro-carbon produced in well-known manner, or of graphite or, finally, so-called gas coal or even of suitably sorted electrically conducting coke, etc. The smaller pieces of carbon placed at the top are preferably of well conducting and porous electro-carbon. The pieces of carbon are, preferably, before being placed on the frame impregnated with electrolyte, for instance of the quality stated above.

Strewn on the layer of carbon pieces is an even layer of copper oxid or, if desired, any other of the substances stated above capable of promoting in the most powerful manner the depolarization effected by the oxygen of the air. If copper oxid (or finely divided copper) be used, a quantity thereof amounting to about 2 grams per square decimeter is sufficient.

Placed on the layer of the granular carbon are spaced plates or rods $C$ of electrically conducting carbon or graphite. Also said plates are, preferably, porous to a certain extent and placed parallel to the short sides of the outer vessel.

Strips of iron $b$ (preferably nickel-plated or coated with any other suitable metal) are screwed to the upper part of the frame I and placed parallel to the short sides of the outer vessel. Springs F of any elastic metal, as steel or brass, etc., are for instance soldered or riveted to the lower side of said iron strips. Said springy members are so arranged that, on screwing the iron strips to the frame, the springs bear with a large contact surface against the carbon rods mentioned above, so that a good contact between the iron strips and the carbon plates is obtained. Owing to the pressure on the carbon pieces a good contact between said pieces is effected at the same time. At the contact places the springs are preferably provided with a thin coating of silver or other suitable metal or with thin plates of such suitable metal soldered to the springs.

The iron strips are interconnected by means of bars or wires $b^1$ of copper, iron or aluminium or other suitable metal, and extensions of said bars or wires, shown in Fig. 2, extend outside the battery forming its positive pole.

At the uppermost portion of the long walls of the cell vessel recesses of less depth are made on the inner part of said walls, rods $u$ (preferably rectangular in form) of wood or other suitable material being inserted in said recesses. Placed on said supporting rods is a porous covering material for instance porous card-board, felted cellulose or asbestos or thin plates or porous wood or the like. It has proved that this cover of porous material prevents evaporation to a great extent and at the same time the formation of creeping salts without hindering to any perceptible extent the free access of the oxygen of the air or its depolarizing action. In Figs. 2 and 3 said porous cover prevents substantially the evaporation from the carbon pieces in the frame, but it may also be placed so as to cover the surface of the electrolyte outside the frame, or in other words, the whole battery. In the latter case the covering device is provided with openings for the pole connections, the shaking device described below and the devices for filling and tapping the battery etc.

The positive pole electrode is supposed to consist of zinc and is, preferably, amalgamated. Z denotes the vertically placed zinc plates (preferably with a thickness of 1.5 to 2.5 mm.), in both ends of which plates apertures are punched, rods $r$ (Fig. 3) of iron or other suitable metal passing through said apertures.

Figs. 4 to 6 show an example of a suitable combination of said zinc plates (strips or bars) and the devices therefor. The zinc strips $z$ passed onto the metal rods $r$ are spaced apart by means of wire spirals $s$ of any elastic metal, for instance iron, steel or brass. The metal rods are at the ends provided with threads, onto which nuts $m$, preferably of iron, are screwed. The outermost strips are thicker strips of another suitable metal (indifferent to the electrolyte in contact with the zinc), for instance iron. When the nuts are screwed up, the spiral springs $s$ are compressed, thus, owing to the pressure against the zinc strips or the iron strips, effecting a good contact between said strips and the other members of the complex. In order to effect the best possible contact at all contact points all the iron members are tinned or nickel plated or coated with any other metal suitable for the said purpose.

During the operation of the battery the surfaces of the zinc plates are covered with a layer of zinc hydrate. When this layer has reached a certain thickness, the free access of electrolyte to the surfaces of the zinc plates is prevented to a rather great extent, the current thereby being weakened. In order to prevent this reduction of the strength of current the complex may be shaken, so that the layer of zinc hydrate is loosened and falls down to the bottom of the vessel.

To the zinc-electrode complex a device may preferably be connected, by means of which such a shaking is effected in a simple manner. When a constant current is generated, a shaking is to be effected twice a month.

Further, sufficient space should be provided for said disengaged zinc hydrate between the zinc-electrode complex and the bottom of the vessel, so that all the zinc hydrate formed can be accompanied therein, until the zinc electrode is consumed. For this purpose the complex is placed at a distance from the bottom of the vessel. This may preferably be effected by inserting, as shown in Fig. 6, at suitable points between the zinc strips supports $V$, $V_1$ preferably of conical shape and tapering downward. Said supports are flattened or flat-ground at the top and, at right angles to the flat, parallel surfaces, perforated by apertures of suitable diameter so as to be able to be passed on the iron rods thus substituting the spiral springs. The supports are preferably placed, as shown in the drawings, in such manner that the first pair $V$ is screwed in at one end of the complex, a second pair $V_1$ at the other end thereof and a third pair V at the side of the central line of the complex. All the supports V are of such a length that they normally rest on the bottom of the vessel, while the pair $V_1$ is a little shorter. By pressing intermittently downwardly on the member B, a shaking movement may be imparted to the zinc-electrode complex. The supports, preferably made of iron, may on their plane contact surfaces be provided with a coating of tin, nickel or other suitable metal.

In Fig. 2 B is one of the iron strips to the center of which is attached, for instance by soldering, a piece $h$ of suitable metal, as iron. Secured in the same manner to said piece is a rod L, preferably of iron, extending from the cell through the space between the frame I and the outer vessel Y, the rod being bent at right angles over the edge of the vessel and, at the end of the horizontal extension, provided with a handle H, which may be pressed down intermittently, and the shaking of the zinc-electrode complex thus be effected.

Since the rod L may serve at the same time as an electric conductor for the zinc electrode, a contact screw may be placed on said rod, said screw serving as the negative terminal of the battery.

The connection of a plurality of batteries may simply be effected in such manner that the positive wire P of a preceding battery is connected with the terminal N of a succeeding battery.

On using the battery for lighting purposes so large a quantity of soluble metal (zinc) has been preferably introduced therein, that the same is sufficient for one or, if desired, two years. After the zinc has been substantially transformed into hydrate, the frame 1 and the zinc-electrode complex is removed, the electrolyte is drawn off by means of a siphon or the like and the zinc hydrate is collected to be utilized in any suitable manner. Then the renewal of the battery is effected by providing the electrode complex provided with fresh zinc strips and the frame with its contacts—which members are substantially indestructible—are inserted anew, and the electrolyte is replaced. Since part of latter is removed together with the hydrate—by pressing the hydrate the greater part of the electrolyte contained therein may be recovered—which is to be replaced by fresh electrolyte of the same composition.

If the carbon pieces consist of coke of ordinary porosity, the distance between the upper level of the carbon pieces and the level of the electrolyte should be about 3 to 4 cm.

In spite of the porous cover, of course, a certain evaporation takes place, and on account thereof fresh water is to be supplied from time to time. This replacement need not be effected more frequently than once a month.

Evidently, the constructional forms and methods described above may be varied without deviating from the principles of the invention.

I claim:

1. A primary galvanic cell comprising an electro-positive porous electrode having a surface exposed to the air, a substance disposed on said air surface capable of facilitating de-polarization by oxygen of the air, an invariable electrolyte, and an electro-negative electrode of a metal the hydroxid of which is insoluble in said electrolyte.

2. A primary galvanic cell comprising an electro-positive porous electrode having a surface exposed to the air, a substance disposed on said air surface capable of facilitating de-polarization by oxygen of the air, an electro-negative metal electrode, and an electrolyte consisting of a solution of an alkali salt, the negative radical of said salt forming with said metal a soluble compound from which the hydroxid of the positive radical of the electrolyte precipitates a hydrate insoluble in the electrolyte.

3. A primary galvanic cell, characterized by an electro-positive porous electrode having a surface exposed to the air, a substance disposed on said air surface capable of promoting depolarization by the oxygen of the air, an invariable electrolyte, an electro-negative metal electrode capable, during the operation of the cell of being transformed into a hydrate insoluble in said electrolyte.

4. A primary galvanic cell, comprising an electro-positive porous electrode, a substance disposed on said electrode in contact with the air and capable of promoting depolarization by the oxygen of the air, an electro-negative metal electrode, and an electrolyte of an alkali salt, said metal electrode and said alkali salt reacting during the generation of current as follows:

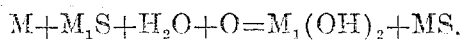

and thereafter

in which formula M designates the active metal of the cell, $M_1$ an alkali metal and S the acid radical combined with the alkali metal, the number of radicals and molecules being variable.

5. A primary galvanic cell comprising an electro-positive porous electrode, a substance disposed on said electrode in contact with the air and capable of permanently promoting depolarizing action by the oxygen of the air, an invariable electrolyte, and an electronegative electrode of a metal whose hydroxid is insoluble in said electrolyte.

6. A primary galvanic cell, characterized by an electropositive porous electrode, an automatically and permanently operating substance disposed on the surface of said electrode in contact with the air and capable of facilitating depolarizing action by the oxygen of the air, an unalterable electrolyte, an electronegative metal electrode the metal of which during the operation of the cell is transformed into a hydrate insoluble in said electrolyte and may be recovered.

7. A primary galvanic cell, comprising an electro-positive electrode of porous carbon, an automatically and permanently active substance disposed on said electrode in contact with the air and capable of promoting depolarizing action by the oxygen of the air, an unalterable electrolyte, and an active metal the hydrate of which is insoluble in said electrolyte.

8. A primary galvanic cell, comprising an electro-negative metal electrode, an unalterable electrolyte, a horizontal electropositive electrode partly submerged in the electrolyte, and an automatically operating substance disposed on said electropositive electrode in contact with the electrolyte and the atmosphere and capable of permanently promoting the depolarizing action by the oxygen of the air.

9. A primary galvanic cell, comprising an electro-negative metal electrode, an unalterable electrolyte, and a horizontal air oxygen depolarizing electrode partly submerged in the electrolyte and having on its upper surface a layer of an oxygen compound of a metal capable of facilitating the depolarizing action by the oxygen of the air.

10. A primary galvanic cell, comprising an air oxygen depolarizer, a metal electrode, and an electrolyte consisting of a solution of an alkali salt with an addition of alkali.

11. A primary galvanic cell, comprising an air oxygen depolarizer, a metal electrode, and an electrolyte consisting of a solution of an alkali salt of a mineral acid with an addition of alkali.

12. A primary galvanic cell, comprising an automatically and permanently active air oxygen depolarizer, a zinc electrode, and an electrolyte consisting essentially of a solution of chlorid of sodium.

13. A primary galvanic battery, comprising an air oxygen depolarizer, a zinc electrode, and an electrolyte consisting of a solution of chlorid of sodium with an addition of alkali.

14. A primary galvanic cell, comprising an unalterable electrolyte, an air oxygen depolarizer, and a metal electrode consisting of a grid of metal bars submerged in the electrolyte.

15. A primary galvanic cell, comprising an air oxygen depolarizer, an unalterable electrolyte, and a metal electrode submerged in said electrolyte and having means for imparting thereto a shaking movement.

16. A primary galvanic cell, comprising an air oxygen depolarizer, an unalterable electrolyte, and a horizontal metal electrode having limbs of different lengths and means for manually imparting thereto a shaking movement.

17. A primary galvanic cell, comprising an air oxygen depolarizer, an unalterable electrolyte, an electrode of a metal the hydroxid of which is insoluble in the electrolyte, and a porous cover capable of retarding the evaporation of the electrolyte 18. A primary galvanic cell comprising an unalterable electrolyte, an electrode of a metal the hydroxid of which is insoluble in the electrolyte, a frame, pieces of electrically conducting carbon in said frame and a substance for promoting the depolarizing action of the oxygen of the air and covering the upper surface of the electrode.

19. A primary galvanic cell comprising an unalterable electrolyte, an electrode of a metal the hydroxid of which is insoluble in the electrolyte, a frame, pieces of electrically conducting carbon in said frame, a substance for promoting the depolarizing action of the oxygen of the air and covering the upper surface of said pieces of carbon, and ribs pressing against said pieces of carbon.

20. A primary galvanic cell comprising an unalterable electrolyte, an electrode of a metal the hydroxid of which is insoluble in the electrolyte, a frame, pieces of electrically conducting carbon in said frame, ribs above said pieces of carbon and serving as terminals, and springs pressing the ribs against the pieces of carbon for effecting a good contact.

21. A primary galvanic cell comprising an unalterable electrolyte, an electrode of a metal the hydroxid of which is insoluble in the electrolyte, a frame, pieces of electrically conducting carbon in said frame, and a thin layer of an oxid of a metal of variable valence disposed on the upper surface of said carbon pieces.

22. A primary galvanic cell, comprising an electropositive electrode, a substance on said electrode capable of promoting the depolarizing action of the oxygen of the air and consisting of an oxid of a metal having variable valence, an unalterable electrolyte, and an electronegative metal electrode.

23. A primary galvanic cell, comprising a metal electrode, an unalterable electrolyte, and an air oxygen depolarizing electrode consisting of a frame, pieces of electrically conducting carbon in said frame, and a substance for promoting the depolarizing action of the oxygen of the air and being on one side in contact with the electrolyte and on the other side in contact with the atmospheric air.

24. A primary galvanic cell, comprising an electrolyte consisting essentially of a solution of an alkali salt, a zinc electrode submerged in said electrolyte and an automatically and permanently acting air-oxygen depolarizer partly in contact with the electrolyte and with the air.

In testimony whereof I have signed my name.

ERNST WALDEMAR JUNGNER.